US009227245B2

(12) United States Patent
Tsai (10) Patent No.: US 9,227,245 B2
(45) Date of Patent: Jan. 5, 2016

(54) LATHE MACHINE FOR INTERNAL BORE PROCESSING

(75) Inventor: Peter T. H. Tsai, Taipei (TW)

(73) Assignee: Alex-Tech Machinery Industrial Co., Ltd., Taichung (TW)

( * ) Notice: Subject to any disclaimer, the term of this patent is extended or adjusted under 35 U.S.C. 154(b) by 806 days.

(21) Appl. No.: 13/554,917

(22) Filed: Jul. 20, 2012

(65) Prior Publication Data

US 2013/0276600 A1    Oct. 24, 2013

(30) Foreign Application Priority Data

Apr. 23, 2012  (TW) .............................. 101114357 A (51) Int. Cl.
  B23B 23/00   (2006.01)
  B23B 5/00    (2006.01)
  B23B 29/02   (2006.01)

(52) U.S. Cl.
  CPC . *B23B 23/00* (2013.01); *B23B 5/00* (2013.01); *B23B 29/02* (2013.01); *Y10T 82/2508* (2015.01)

(58) Field of Classification Search
  CPC .......... B23B 23/00; B23B 5/00; B23B 29/02; Y10T 82/2508
  USPC ............. 82/121, 148, 157, 158, 161, 1.2–1.5; 29/27 R, 27 C, 42–44, 45, 46, 47, 29/37 R–38 F; 74/813 R, 813 L
  See application file for complete search history.

(56) References Cited

U.S. PATENT DOCUMENTS

| | | | | |
|---|---|---|---|---|
| 2,255,739 | A * | 9/1941 | Curtis ................................ | 29/44 |
| 4,770,568 | A * | 9/1988 | Perez et al. ........................ | 408/6 |
| 5,052,089 | A * | 10/1991 | Gadaud et al. ................. | 29/27 R |
| 5,097,575 | A * | 3/1992 | Mitsukuchi et al. .......... | 29/27 C |
| 5,214,829 | A * | 6/1993 | Minagawa ..................... | 29/27 C |
| 5,947,020 | A * | 9/1999 | Bornhorst et al. ............. | 358/3.3 |
| 5,964,016 | A * | 10/1999 | Ito et al. ......................... | 29/27 C |
| 6,640,678 | B2 * | 11/2003 | Kumano ......................... | 82/129 |
| 6,865,789 | B2 * | 3/2005 | Katoh ................... | B23B 29/242 29/39 |
| 7,219,407 | B2 * | 5/2007 | Schneider ............... | B23B 3/065 29/27 C |
| 8,371,195 | B2 * | 2/2013 | Tsai ....................... | B23B 3/167 82/121 |
| 2005/0034575 | A1 * | 2/2005 | Wu .................................. | 82/121 |
| 2005/0137069 | A1 * | 6/2005 | Ueda ............................... | 483/27 |
| 2005/0217442 | A1 * | 10/2005 | Akimoto et al. ................ | 82/129 |
| 2006/0236514 | A1 * | 10/2006 | Sasazawa ............... | B32B 3/065 29/27 C |
| 2009/0053000 | A1 * | 2/2009 | Miyano et al. .................. | 408/55 |
| 2009/0095126 | A1 * | 4/2009 | Hyatt ..................... | B32B 29/323 74/822 |

(Continued)

FOREIGN PATENT DOCUMENTS

JP          2003080404 A  *  3/2003  .............. B23B 23/00

*Primary Examiner* — Sunil K Singh
*Assistant Examiner* — Sara Addisu
(74) *Attorney, Agent, or Firm* — Locke Lord LLP (57) ABSTRACT

A lathe machine includes a tailstock unit having a bottom seat driven by a saddle of a turret unit to move longitudinally relative to a headstock by means of a first coupler unit, and a tailstock mount mounted on the bottom seat and driven by a turret mount to move transversely by means of a second coupler unit such that a selected one of a centering mandrel and a drilling tool holder disposed on the tailstock mount is in line with a spindle axis of the headstock. A positioning unit includes blocking and abutment members respectively disposed on the bottom seat and the tailstock mount and having rightward- and leftward-facing inclined surfaces which matingly abut against each other to permit the centering mandrel to be kept in line with the spindle axis, thereby rendering the centering process easy and precise.

4 Claims, 9 Drawing Sheets

(56) References Cited

U.S. PATENT DOCUMENTS

| | | | |
|---|---|---|---|
| 2010/0288090 A1* | 11/2010 | Lee | 82/137 |
| 2011/0067535 A1* | 3/2011 | Tsai | 82/121 |
| 2015/0239081 A1* | 8/2015 | Niidoi | B23P 23/02 451/54 |

* cited by examiner

LATHE MACHINE FOR INTERNAL BORE PROCESSING

CROSS-REFERENCE TO RELATED APPLICATION

This application claims priority of Taiwanese Patent Application No. 101114357, filed on Apr. 23, 2012, the disclosure of which is herein incorporated by reference.

BACKGROUND OF THE INVENTION

1. Field of the Invention

This invention relates to a lathe machine, more particularly to a lathe machine adapted for processing a deep internal bore in a workpiece.

2. Description of the Related Art

Figure 1:
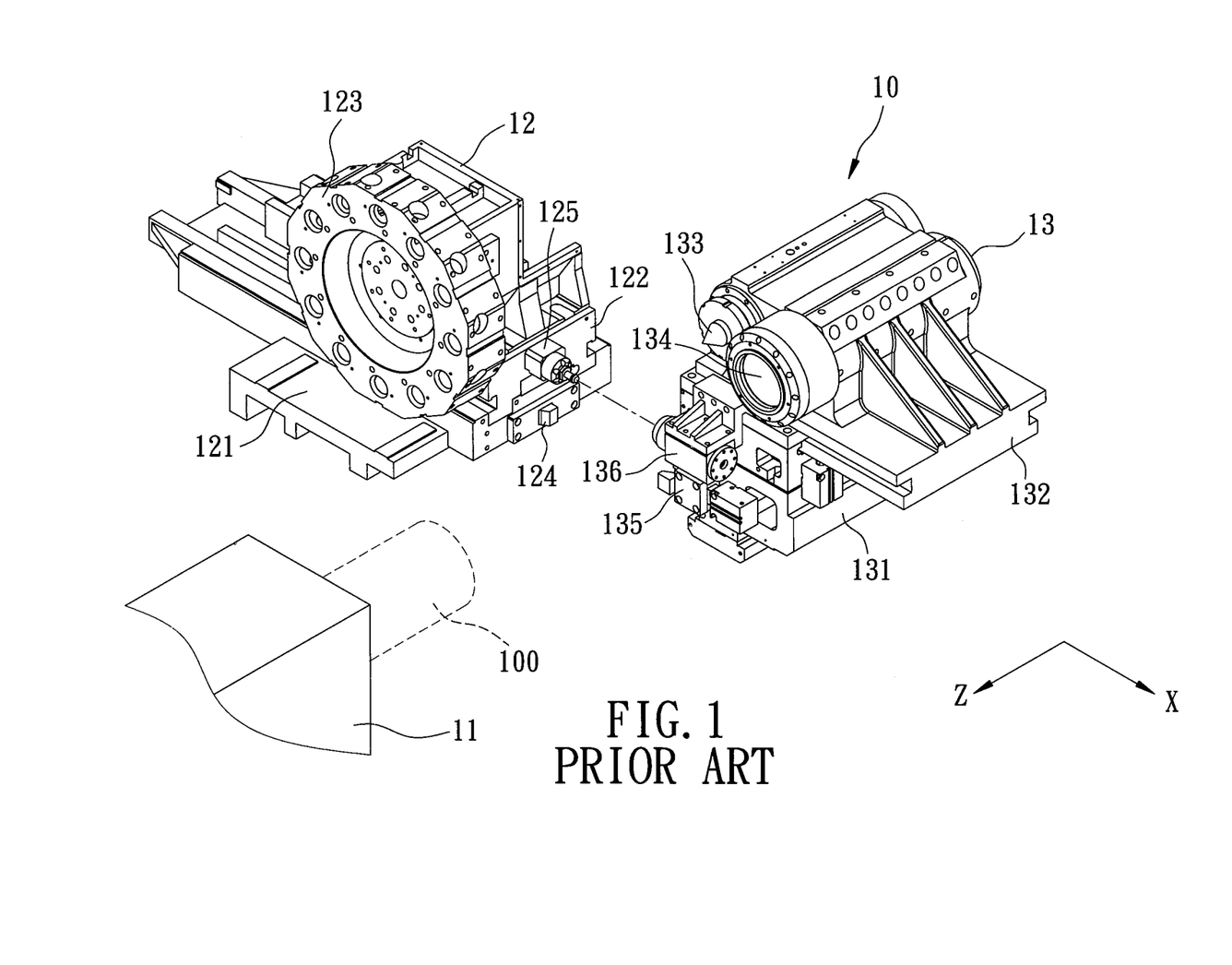
FIG. 1 is a perspective view of a portion of a conventional lathe machine.

Referring to FIG. 1, a conventional lathe machine 10 for internal bore processing as disclosed in Taiwan Publication No. 200940219 is shown to include a headstock 11, a turret 12, and a tailstock 13. The headstock 11 is fixedly mounted on a machine bed (not shown) for rotatably holding a workpiece 100. The turret 12 includes a saddle 121 movably disposed on the machine bed along a Z-axis direction, and a rotatable turret mount 122 movably disposed on the saddle 121 along an X-axis direction for mounting a plurality of cutting tools (not shown). The tailstock 13 includes a bottom seat 131 movably disposed on the machine bed along the Z-axis direction, a tailstock mount 132 movably disposed on the bottom seat 131 along the X-axis direction, and a centering mandrel 133 and a drilling tool holder 134 which are disposed on the tailstock mount 132 and which are juxtaposed to each other. A first plug 124 and a first socket 135 are disposed on the saddle 121 and the bottom seat 131, respectively, and are engageable with each other such that the tailstock 13 is driven by the saddle 121 to move in the Z-axis direction. A second plug 125 and a second socket 136 are disposed on the turret mount 122 and the tailstock mount 132, respectively, and are engageable with each other such that the tailstock mount 132 is driven by the turret mount 122 to move in the X-axis direction. A selected one of the centering mandrel 133 and the drilling tool holder 134 is used according to the machining process to be performed. When it is desired to use the centering mandrel 133, the tailstock mount 132 is displaced in the X-axis direction to bring the centering mandrel 133 in line with a spindle axis of the workpiece 100. Then, a positioning member (not shown) disposed on the bottom seat 131 is driven to secure the tailstock mount 132 in place. When it is desired to perform a deep internal boring, the saddle 121 is engaged with the bottom seat 131 so as to control the amount of movement of a drilling tool mounted on the drilling tool holder 134 in the X-axis direction.

However, as the saddle 121 is engaged with the bottom seat 131 only by means of the first plug 124 and the first socket 135, the first plug 124 and the first socket 135 have to bear the weight of the entire tailstock 13, so that shaking and intermittent separation of the saddle 121 and the bottom seat 131 may occur during machining processes. Moreover, it is difficult to displace the centering mandrel 133 to be precisely in line with the spindle axis of a workpiece 100, thereby adversely affecting the centering effect.

SUMMARY OF THE INVENTION

An object of the present invention is to provide a lathe machine which can perform a deep internal boring process and which can achieve a stable and precise cutting operation.

According to this invention, the lathe machine includes a machine bed, a headstock mounted fixedly on a front part of the machine bed and having a spindle for holding a workpiece, and a tailstock unit including a bottom seat which is mounted on a rear part of the machine bed and movable in a longitudinal direction relative to the headstock, a tailstock mount which is mounted on the bottom seat and movable in a transverse direction relative to the bottom seat, and a centering mandrel and a drilling tool holder which are mounted on the tailstock mount and which respectively define a centerline and a drilling line. The drilling tool holder is juxtaposed to the centering mandrel in the transverse direction such that, by means of displacement of the tailstock mount in the transverse direction, a selected one of the centerline and the drilling line is in line with a spindle axis of the spindle. A turret unit includes a saddle which is mounted on the rear part of the machine bed and movable in the longitudinal direction relative to the headstock, a turret mount which is mounted on the saddle and movable in the transverse direction relative to the saddle, and which has amount front that confronts a leftwardly facing wall of the tailstock mount, and a turret which is mounted on the turret mount. A first coupler unit is disposed to releasably couple the saddle with the bottom seat so as to permit the bottom seat to be moved with the saddle in the longitudinal direction. A second coupler unit is disposed to releasably couple the mount front with the leftwardly facing wall so as to permit the tailstock mount to be moved with the turret mount in the transverse direction. A positioning unit includes a blocking member which is disposed on and movable relative to the bottom seat in an upright direction and which has a rightward-facing inclined surface, and an abutment member which is disposed to be movable with the tailstock mount in the transverse direction, and which has a leftward-facing inclined surface that is configured to matingly abut against the rightward-facing inclined surface so as to permit the centerline to be kept in line with the spindle axis.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 2:
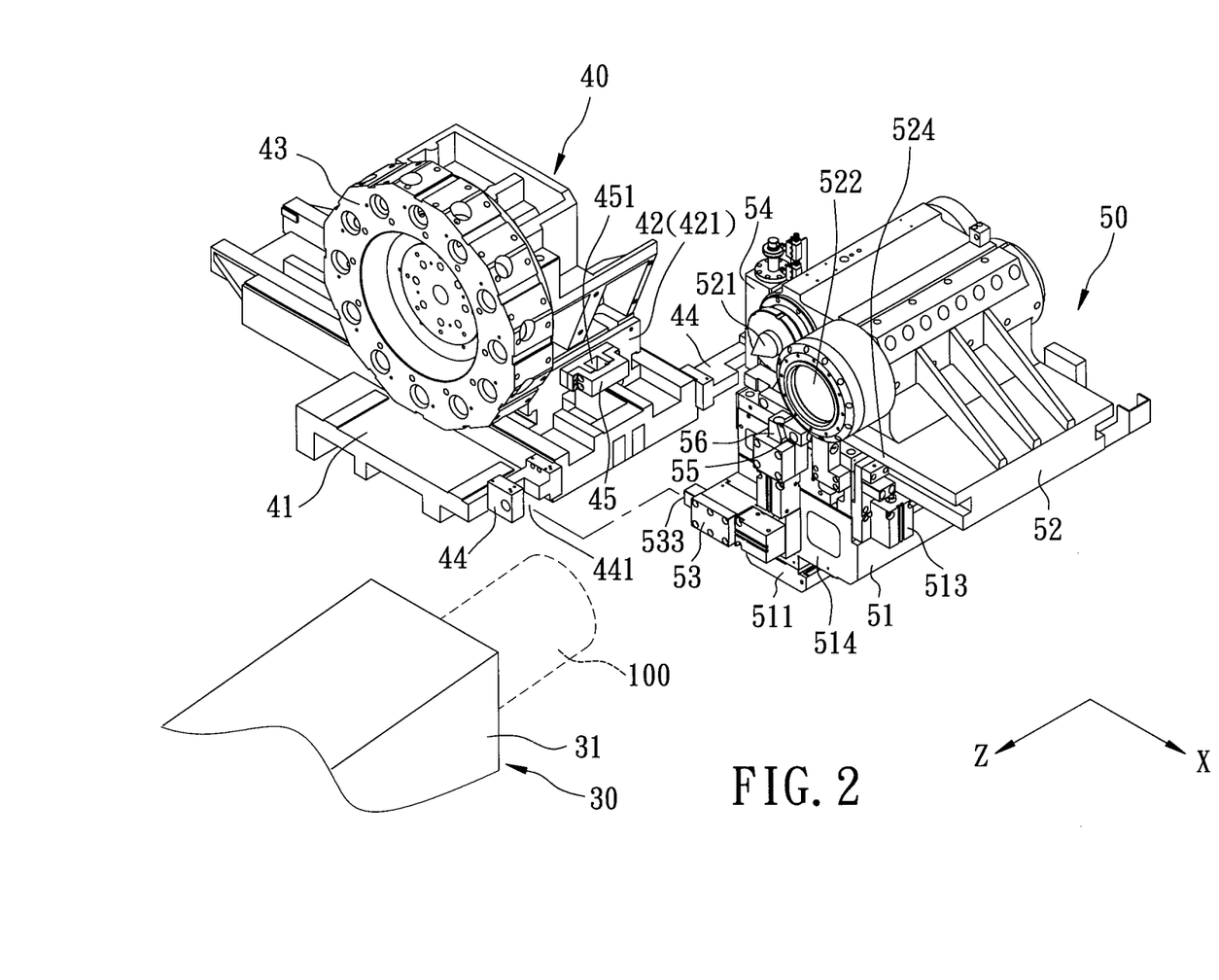
FIG. 2 is a perspective view of a portion of the preferred embodiment of a lathe machine according to this invention.
Figure 3:
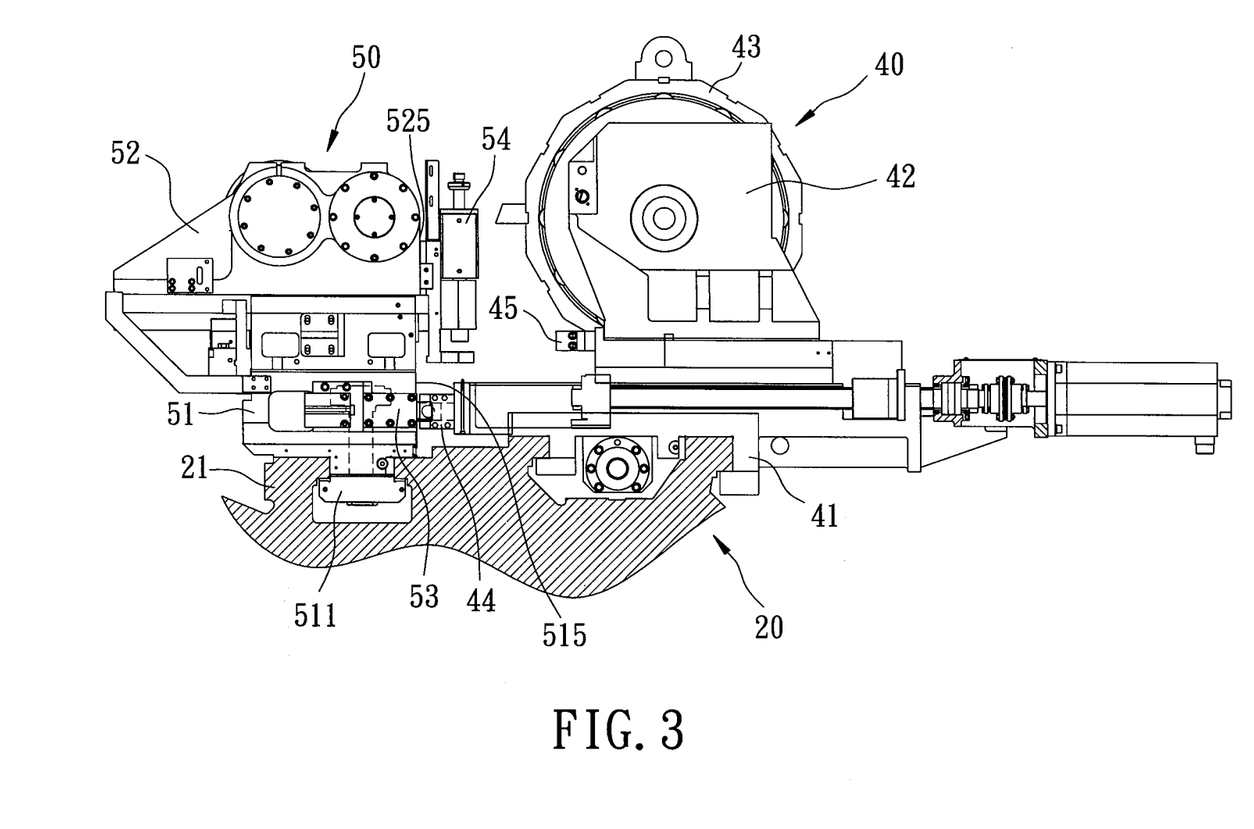
FIG. 3 is a schematic side view of the preferred embodiment.

Referring to FIGS. 2 and 3, the preferred embodiment of a lathe machine according to the present invention is shown to comprise a machine bed 20, a headstock 30 mounted fixedly on a front part of the machine bed 20, a tailstock unit 50 disposed on a rear part of the machine bed 20, and a turret unit 40.

Figure 5:
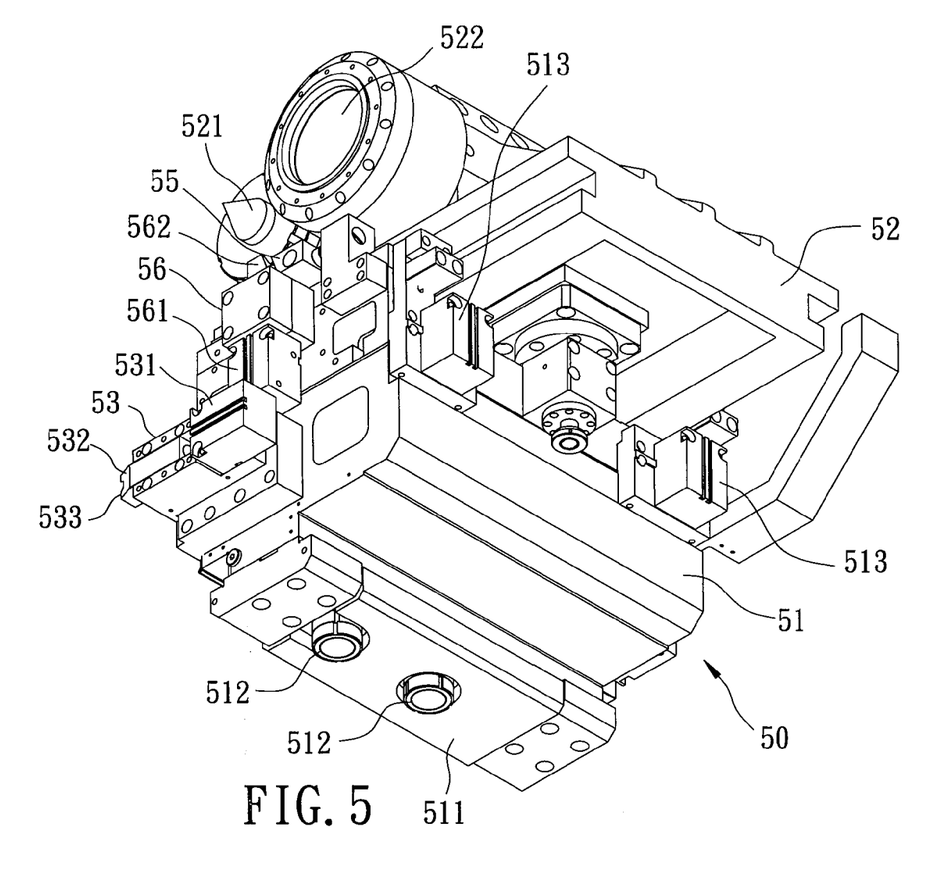
FIG. 5 is a perspective view of the tailstock unit of the preferred embodiment.
Figure 6:
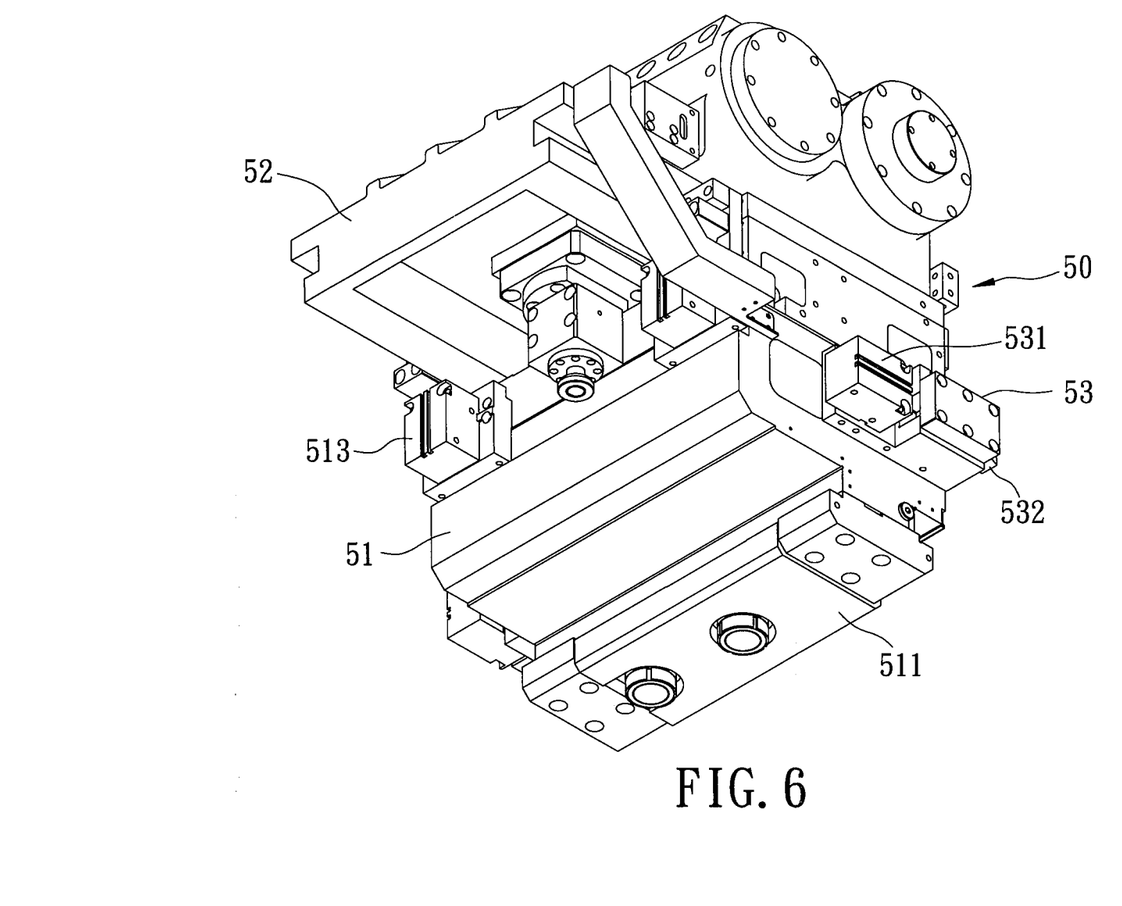
FIG. 6 is an another perspective view of the tailstock unit.
Figure 7:
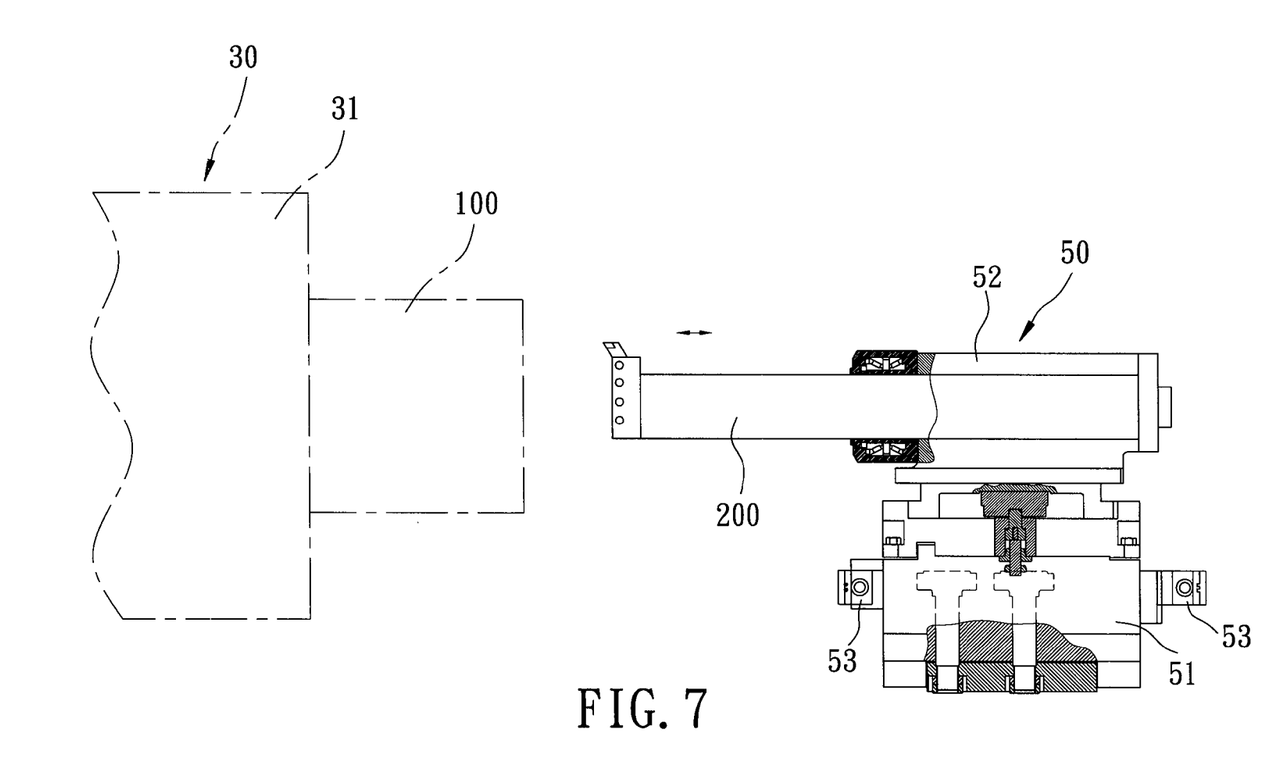
FIG. 7 is a schematic view showing the preferred embodiment in an internal boring process.
Figure 8:
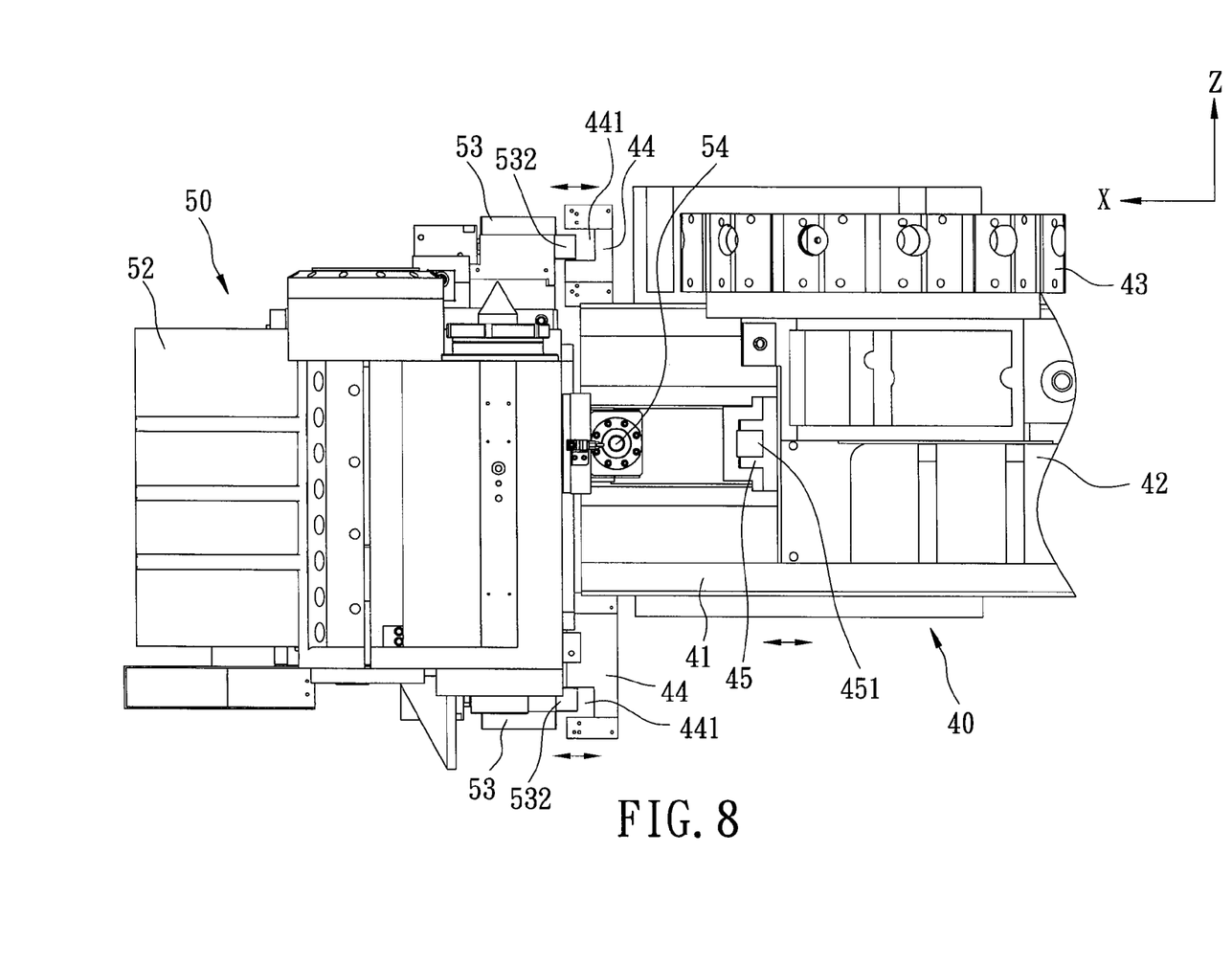
FIG. 8 is a schematic top view showing that a turret unit is displaced to be engaged with the tailstock unit.

The headstock 30 has a spindle 31 which defines a spindle axis, and which is configured for holding a workpiece 100 to rotate about the spindle axis. The tailstock unit 50 includes a bottom seat 51 which is mounted on the machine bed 20 and movable in a longitudinal direction (Z) relative to the headstock 30, and a tailstock mount 52 which is mounted on the bottom seat 51 and movable in a transverse direction (X) relative to the bottom seat 51. Specifically, with reference to FIGS. 4 and 5, the bottom seat 51 has a slide plate 511 which is in slidable engagement with a slide rail 21 of the machine bed 20 and driven by two driving members 512 to be displaced in an upright direction so as to lock or release the tailstock unit 50 to or from the machine bed 20. Referring to FIGS. 5 and 6, two supporting members 513 are disposed on the bottom seat 51 to be frictionally engaged with the tailstock mount 52 to position the tailstock mount 52 in the transverse direction (X). The bottom seat 51 and the tailstock mount 52 respectively have first and second front end walls 514, 524 which confront the headstock 30, and first and second leftwardly facing walls 515, 525 which extend in the longitudinal direction (Z). A centering mandrel 521 and a drilling tool holder 522 are mounted on the tailstock mount 52 to be juxtaposed to each other in the transverse direction (X), and define a centerline and a drilling line, respectively, such that, by means of displacement of the tailstock mount 52 in the transverse direction (X), a selected one of the centerline and the drilling line is in line with the spindle axis of the spindle 31. Specifically, as shown in FIG. 7, the drilling tool holder 522 is a tool mounting barrel to hold a drilling tool 200 for a deep internal boring process.

The turret unit 40 includes a saddle 41 which is mounted on the rear part of the machine bed 20 and movable in the longitudinal direction (Z) relative to the headstock 30, a turret mount 42 which is mounted on the saddle 41 and movable in the transverse direction (X) relative to the saddle 41, and which has amount front 421 that confronts the second leftwardly facing wall 525 in the transverse direction (X), and a rotatable turret 43 which is mounted on the turret mount 42 for mounting a plurality of cutting tools (not shown).

Referring back to FIGS. 2 and 5, a first coupler unit is disposed to releasably couple the saddle 41 with the bottom seat 51 so as to permit the bottom seat 51 to be moved with the saddle 41 in the longitudinal direction (Z). Specifically, the first coupling unit includes two first sockets 44 which are disposed on the saddle 41 and which are opposite to each other in the longitudinal direction (Z), and two first cylinder and piston assembles 53 disposed on the bottom seat 51 and flank of the first leftwardly facing wall 515. Each of the first cylinder and piston assemblies 53 includes a first cylinder 531 and a first piston rod 532 which is retractably extendable relative to the first cylinder 531 in the transverse direction (X), and which has a first plug end 533 that is configured to be engaged in a slot 441 in a respective one of the first sockets 44 when the first piston rod 532 is extended.

Figure 4:
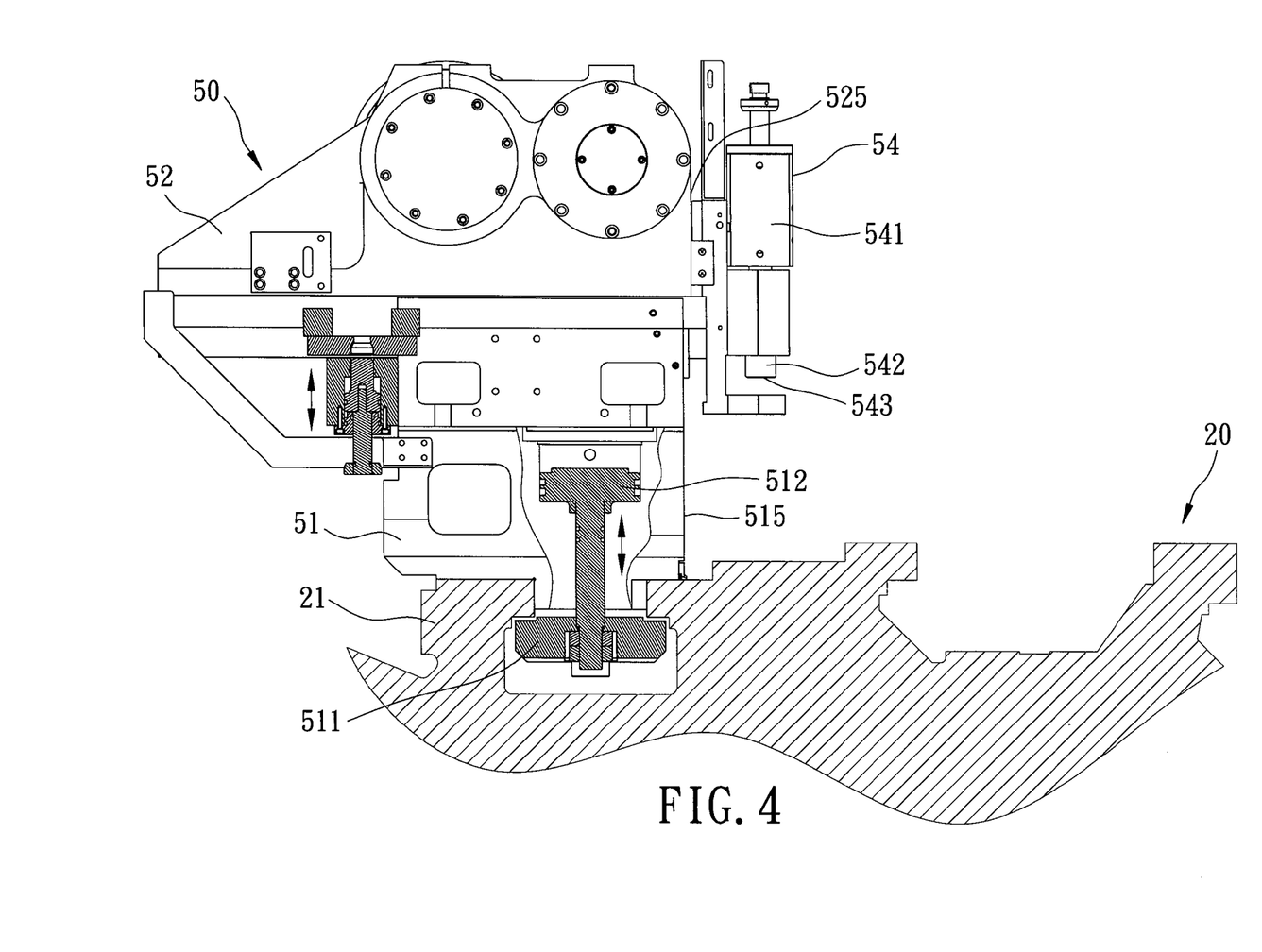
FIG. 4 is a schematic side view of a tailstock unit of the preferred embodiment.

Referring to FIGS. 2 to 4, a second coupler unit is disposed to releasably couple the mount front 421 with the second leftwardly facing wall 525 so as to permit the tailstock mount 52 to be moved with the turret mount 42 in the transverse direction (X). Specifically, the second coupling unit includes a second socket 45 disposed on the mount front 421 and a second cylinder and piston assembly 54 which is disposed on the tailstock mount 52, and which includes a second cylinder 541 and a second piston rod 542 which is retractably extendable relative to the second cylinder 541 in the upright direction and which has a second plug end 543 that is configured to be engaged in an upright rectangular hole 451 in the second socket 45 when the second piston rod 542 is extended.

Figure 9:
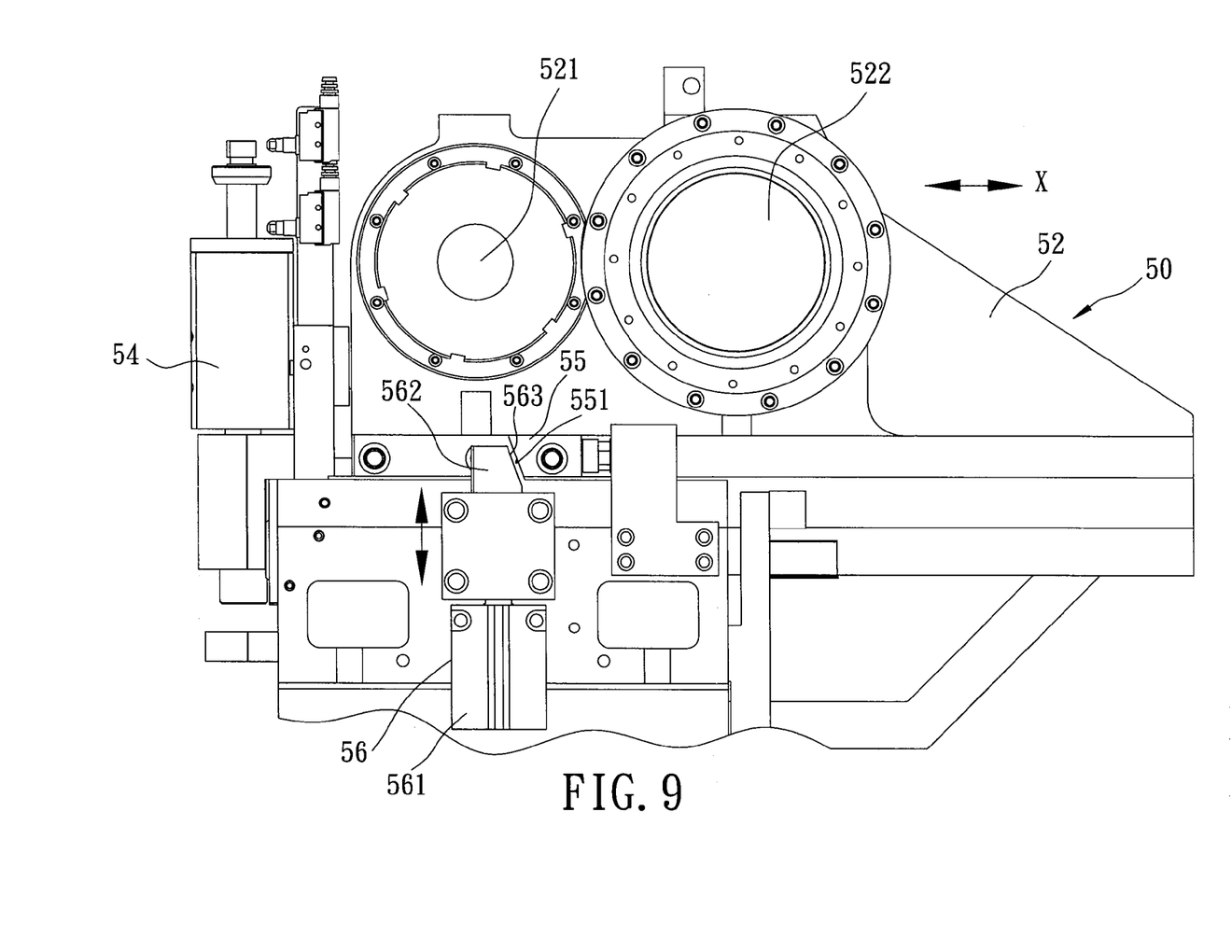
FIG. 9 is a schematic side view showing the preferred embodiment in a centering process.

Referring to FIGS. 5 and 9, a positioning unit includes a third cylinder and piston assembly 56 disposed on the first front end wall 514 of the bottom seat 51 and an abutment member 55 disposed on the second front end wall 524 of the tailstock mount 52. The third cylinder and piston assembly 56 includes a third cylinder 561 disposed on the first front end wall 514 of the bottom seat 51, and a third piston rod 562 which serves as a blocking member. The third piston rod 562 is retractably extendable relative to the third cylinder 561 in the upright direction and has a rightward-facing inclined surface 563 that is displaceable between extended and retracted positions. The abutment member 55 has a leftward-facing inclined surface 551 that is configured to matingly abut against the rightward-facing inclined surface 563 so as to permit the centerline to be kept in line with the spindle axis of the spindle 31.

As illustrated, by engagement of the first coupler unit, i.e., the first piston rods 532 and the first sockets 44, the tailstock unit 50 can be steadily moved with the saddle 41 in the longitudinal direction (Z). As shown in FIG. 9, when it is desired to use the centering mandrel 521, the third piston rod 562 (the blocking member) is extended to permit the rightward-facing inclined surface 563 to be in the extended position. The tailstock mount 52 is moved in the transverse direction (X) to permit the leftward-facing inclined surface 551 to matingly abut against the rightward-facing surface 551. At this stage, the centerline of the centering mandrel 521 is in line with the spindle axis of the spindle 31. Thus, the centering mandrel 521 is precisely and quickly positioned to the center of the workpiece 100. By mating engagement between the rightward- and leftward-facing inclined surfaces 551, 563, the tailstock mount 52 is steadily supported so as to perform a stable machining process.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

What is claimed is:

1. A lathe machine comprising:
  a machine bed;
  a headstock mounted fixedly on a front part of said machine bed and having a spindle which defines a spindle axis, and which is configured for holding a workpiece;
  a tailstock unit including
  a bottom seat which is mounted on a rear part of said machine bed and movable in a longitudinal direction relative to said headstock, and which has a first front end wall that confronts said headstock, and a first leftwardly facing wall that extends in the longitudinal direction,
  a tail stock mount which is mounted on said bottom seat and movable in a transverse direction relative to said bottom seat, and which has a second front end wall that confronts said headstock, and a second leftwardly facing wall that extends in the longitudinal direction,
  a centering mandrel which is mounted on said tailstock mount, and which defines a centerline, and
  a drilling tool holder which is mounted on said tailstock mount, and which defines a drilling line, said drilling tool holder being juxtaposed to said centering mandrel in the transverse direction such that, by means of displacement of said tailstock mount in the transverse direction, a selected one of the centerline and the drilling line is in line with the spindle axis;

a turret unit including a saddle which is mounted on said rear part of said machine bed and movable in the longitudinal direction relative to said headstock, a turret mount which is mounted on said saddle and movable in the transverse direction relative to said saddle, and which has a mount front that confronts said second leftwardly facing wall in the transverse direction, and a turret which is mounted on said turret mount;

a first coupler unit disposed to releasably couple said saddle with said bottom seat so as to permit said bottom seat to be moved with said saddle in the longitudinal direction;

a second coupler unit disposed to releasably couple said mount front with said second leftwardly facing wall so as to permit said tailstock mount to be moved with said turret mount in the transverse direction; and a positioning unit including a blocking member which is disposed on and movable relative to said first front end wall of said bottom seat in an upright direction that is transverse to both the longitudinal and transverse directions, and which has a rightward-facing inclined surface, and an abutment member which is disposed to be movable with said second front end wall of said tailstock mount in the transverse direction, and which has a leftward-facing inclined surface that is configured to matingly abut against said rightward-facing inclined surface of said blocking member so as to permit the centerline to be kept in line with the spindle axis.

2. The lathe machine as claimed in claim 1, wherein said positioning unit includes a cylinder which is disposed on said first front end wall of said bottom seat, said blocking member being in form of a piston rod which is retractably extendable relative to said cylinder in the upright direction so as to permit said rightward-facing inclined surface to be displaceable between extended and retracted positions.

3. The lathe machine as claimed in claim 1, wherein said first coupling unit includes two first sockets which are disposed on said saddle and which are opposite to each other in the longitudinal direction, two first cylinders which are disposed on said bottom seat and flank of said first leftwardly facing wall, and two first piston rods which are retractably extendable relative to said first cylinders, respectively, in the transverse direction, and each of which has a first plug end that is configured to be engaged in a respective one of said first sockets when a respective one of said first piston rods is extended.

4. The lathe machine as claimed in claim 1, wherein said second coupling unit includes a second socket which is disposed on said mount front of said turret mount, a second cylinder which is disposed on said second leftwardly facing wall of said tailstock mount, and a second piston rod which is retractably extendable relative to said second cylinder in the upright direction and which has a second plug end that is configured to be engaged in said second socket when said second piston rod is extended.

* * * * *